June 17, 1941.  O. W. BECKER  2,246,236
ARTIFICIAL CASING
Original Filed April 19, 1937
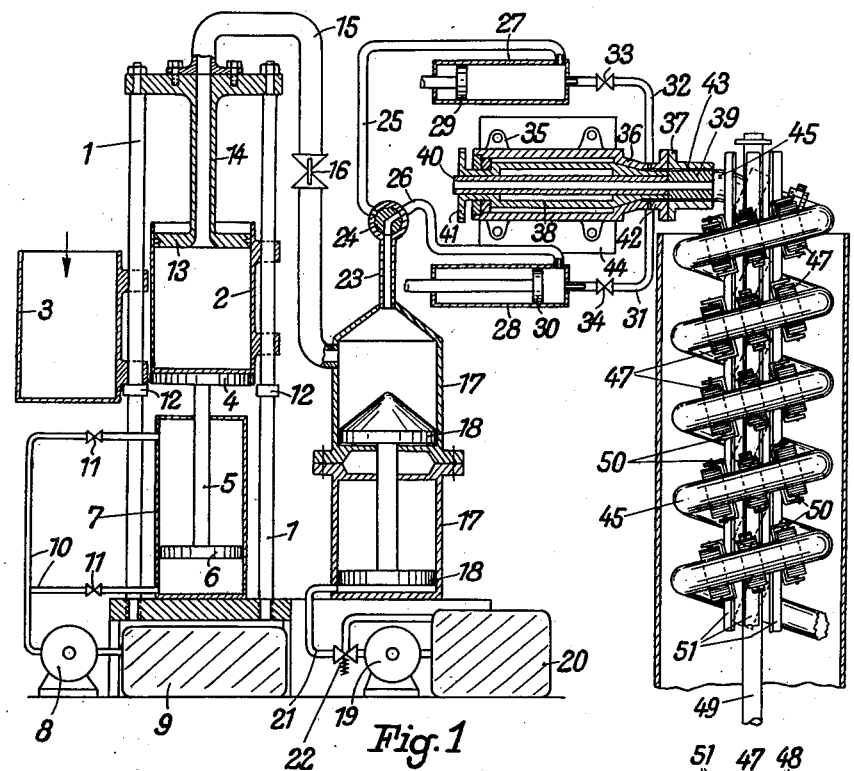
Fig. 1
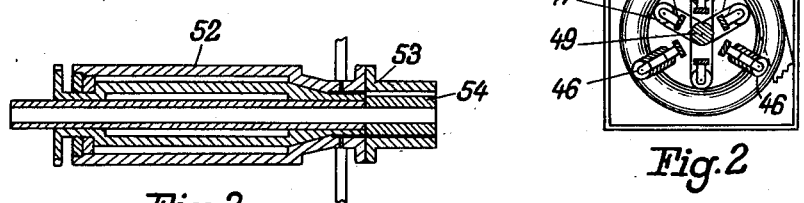
Fig. 2
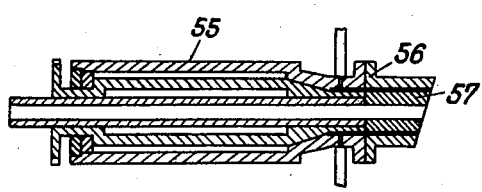
Fig. 3
Fig. 4
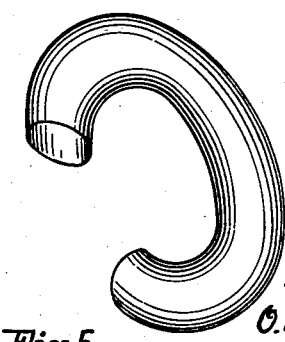
Fig. 5
Inventor:
O. W. Becker Patented June 17, 1941

2,246,236

UNITED STATES PATENT OFFICE 2,246,236

ARTIFICIAL CASING

Oskar Walter Becker, Heidelberg, Germany, assignor to the firm Naturin-Werk Becker & Co., Weinheim, Baden, Germany Continuation of application Serial No. 137,858, April 19, 1937, which is a division of application Serial No. 80,647, May 19, 1936. This application May 17, 1939, Serial No. 274,286. In Germany May 23, 1935

6 Claims. (Cl. 99—176)

This application is a continuation of application Serial No. 137,858 filed April 19, 1937, and the latter application is a division of application Serial No. 80,647 filed May 19, 1936.

According to the present invention artificial curved casings, that is gut of swollen, plastically kneadable fibrous masses of animal origin are produced for the first time in continuous operation. In this production a straight tube is first formed by pressing the fibrous mass through annular nozzles, which tube is carried off helically and simultaneously dried and hardened, whereby a spiral tube is produced. The latter can be separated then into individual arc or circularly formed pieces.

The invention relates to the production of artificial ring-shaped skins or tubes for sausages to be boiled or fried and the like from plastic, kneadable fibrous masses of animal origin, which have, for example, been obtained from hide, sinews, muscles, flesh and the like. The term "ring-shaped skins or tubes" as used herein means skins or tubes in the form of wreaths or rings.

Certain of the applicant's patents disclose processes for the production of artificial sausage skins of straight cylindrical form by treating hide with chemicals, for example swelling chemicals, and mechanically comminuting and shredding the swollen material, after which the resulting plastic kneadable fibrous mass is extruded through annular nozzles and the tubular structures so obtained are dried and hardened. Annular nozzles, the annular space of which is in part constituted by movable elements, for example annular nozzles, the core or jacket of which is rotatable, have proved to be particularly advantageous. On extruding the fibrous paste through annular nozzles air or hot gases are with advantage blown into the interior of the tubular structures as they are formed, the said tubular structures being dried and hardened with water-displacing or tanning agents while in a state of inflation.

In continuation of his researches the applicant has first investigated the problem of producing artificial ring-shaped skins or tubes. He has found that artificial ring-shaped skins or tubes may be continuously produced by preparing a helical tube of any desired length by extruding a plastic kneadable fibrous mass of animal origin through an annular nozzle, while blowing gases into the interior of the tube being formed and helically withdrawing the tube, which is dried, hardened and is separated before use into individual pieces, which constitute the desired ring-shaped skins or tubes.

The process of this invention may be carried out in various ways. A straight or almost straight cylindrical tube may be first produced and withdrawn helically round a conveying apparatus. On the other hand by suitably constructing the annular nozzle a curved tube may be produced which is likewise withdrawn helically. Finally by suitably constructing the annular nozzle a tube may be produced, which issues from the nozzle in the form of a helix and is withdrawn helically.

An ordinary annular nozzle may be used for shaping the tube. Preferably however, an annular nozzle with movable, particularly rotatable, parts is employed. In this case the core and/or the jacket of the nozzle may be made rotatable. If both nozzle parts are made rotatable they may rotate in the same or in the opposite direction and at the same or different speeds.

When employing nozzles with rotatable parts a tube is obtained, which rotates about its axis at a speed depending upon the speed and direction of rotation of the parts. If in a particular case it would appear advisable to retard or check this rotation of the tube, annular nozzles are employed, the rear portion of which consists of one or two rotatable parts and the front portion of stationary parts. If the stationary part is selected of suitable length a tube may be obtained, which practically no longer rotates about its longitudinal axis. The same result is obtained if, instead of employing a front stationary part, the rear part is so constructed that the core and the jacket of the nozzle rotate at the same speed in different directions.

The annular nozzles may for example be constructed in accordance with patent application Serial No. 554,919, filed August 3, 1931.

In addition to the rotatability of the nozzle parts, the position of the nozzle core and the construction of the nozzle orifice are of decisive importance for the action of the annular nozzle and the shape of the tube formed.

If an ordinary nozzle with a centrally disposed core is employed, a straight tube issues from the nozzle, which tube on being wound helically becomes non-uniform. Its outer side, which is subjected to the greatest tension, becomes thinner and weaker than the inner side, so that it was to be expected that the finished ring-shaped tube would have a tendency to burst on one side under load. Experiments have shown that this non-uniformity may be as high as 10%. In general this non-uniformity is not detrimental, particularly if tubes are prepared from the start, the wall thickness of which exceeds the desired thickness by about 10%. In this case products are produced which, notwithstanding a slight non-uniformity in the wall thickness, withstand the mechanical strains produced on filling the sausage skins and also on frying or boiling the sausages.

The ideal solution would however be to produce a skin or tube which is entirely uniform. In following up this object the applicant has found that uniform ring-shaped skins or tubes may be produced by increasing the wall thickness of the straight or almost straight tube issuing from the annular nozzle along a part of its periphery and withdrawing the tube helically in such a way that the part having an increased wall thickness is disposed on the outer side of the resulting helical tube.

A tube strengthened on one side as aforesaid may for example be produced by disposing the core of the nozzle eccentrically in the latter, so that an annular gap results, the narrowest part of which corresponds to the desired thickness of the gut and the widest part of which exceeds this thickness by the extent of the desired thickening. The ratio of the minimum distance between the core and the jacket of the nozzle to the maximum distance between the core and the jacket is so selected, particularly in accordance with the diameter of the helical tube to be produced, that a tube results, the outer side of which is thickened to such a degree that it is stretched under the influence of the tension produced when helically withdrawing the tube, to the thickness of the inner side. A nozzle is for example employed, the core of which is so disposed that the annular gap at the narrowest point amounts to 0.38 mm. and at the point of the maximum distance between the core and inner wall of the nozzle amounts to 0.52 mm. A tube of non-uniform thickness which is slightly curved owing to its non-uniformity discharges from such a nozzle and is withdrawn helically in uniform windings, whereby its thickened outer surface is always subjected to the greatest tension. This is for example effected by means of rollers mounted helically round an axis which form the tube into windings having an internal diameter of about 160 mms. Since the thickened outer side of the helical tube is thereby subjected to by far the greatest tension, the finished helical structure acquires a uniform wall thickness, which with a diameter of about 45 mms. and the above indicated arrangement of the eccentric nozzle core amounts to about 0.45 mm.

The ratio of the minimum distance to the maximum distance between the core and the jacket of the nozzle is substantially determined by the inner diameter of the helical tube to be produced. The smaller is the diameter of the helical tube and accordingly the degree of tension of the outer side of the tube during its helical winding, the greater must be the difference between these two values. With increasing diameter of the helical tube the ratio may approach the value 1.

According to another embodiment of the invention a strongly curved discharging tube is produced at the start by the construction of the nozzle. For this purpose nozzles are for example employed, the orifices of which are bevelled laterally. Owing to the lower resistance on the bevelled side on extruding the mass through the annular nozzle, the discharging tube assumes a curve of varying degree, which depends on the extrusion pressure and on the construction of the nozzle core. If annular nozzles are employed which are provided with rotating or partially rotating parts and with bevelled nozzle orifices, the tube automatically issues in helical form and need only be maintained in this form during its withdrawal. In this case it is not necessary to shape the tube on its discharge from the nozzle in such a way that it possesses an increased wall thickness along a part of its periphery, since during the helical withdrawal of the tube produced in curved form, stretching in order to render the entire periphery uniform need not necessarily be effected. On the contrary, helical withdrawal of the tube without stretching is sufficient. It is however frequently advisable to effect the helical withdrawal of the tube issuing from the nozzle in curved form under tension, in order to maintain or correct its shape. In this case it is advisable to make the tube issuing from the nozzle of varying thickness, for example by employing an eccentric nozzle core and thereby to equalize any undesired weaknesses in the wall strength of the outer side of the helix.

Any conveying device, round which the tube can be wound helically, if necessary under tension, may be used for the helical withdrawal under tension of the straight or almost straight tube issuing from the nozzle or for the helical withdrawal without tension of the tube issuing in curved form from the nozzle. A roller track, which consists of guiding rollers disposed in concentric windings about an axis and some of which are driven from the driving shaft and others are disposed free and rotatable, is preferably employed. The driven rollers are actuated by elastic drives, for example rubber rings or spiral springs. The rollers are adjustable so that the diameter of the helical tubes can be altered as desired.

The tubes are dried in known manner and rendered resistant to boiling by treatment with water-displacing or tanning agents, for example fumigating liquids, after which they are again dried and finally reduced between rollers to a flat shape, which facilitates their packing. The drying and/or the hardening may be effected during the helical winding or withdrawing operations or subsequently thereto.

Protein-containing fibrous pastes obtained from hide, hide parts, de-tanned leather, sinews, muscles, flesh and the like are employed as starting materials. In order to produce the fibrous hide paste, these starting materials are subjected to a loosening or disintegrating treatment, after which they are mechanically comminuted or shredded.

The starting materials may, for example, be opened up or disintegrated by treatment with swelling chemicals. Swelling may be effected with alkaline or acid liquids or with salt solutions. If desired, different swelling agents may be employed, the concentration of which are adapted to the starting material as well as to the degree of desired disintegration. Hide may, for example, be first subjected to prolonged liming and be thereafter treated with hydrochloric acid or flesh may be converted into the desired swollen condition by treating the same only with hydrochloric acid. The swelling treatment is in general continued until the protein-containing starting material can be converted by the mechanical treatment into a pasty, plastic, kneadable mass. In general the swelling is continued until the flesh takes up a considerable amount, for example 75% and more, of swelling water.

The disintegration of the protein-containing material may also be effected by heat treatment in the presence of water. Finally, the starting materials may be subjected to a partial hydrolytic decomposition under the action of heat and be simultaneously or subsequently treated with swelling chemicals.

The swollen material, the fibrous structure of which has been loosened, may in certain circumstances be shaped directly by extrusion through annular nozzles. In general, however, the swollen material is subjected to a comminuting and shredding treatment in one or more stages, which must be so conducted that the fibrous structure of the material, particularly the length of the fibres, is preserved. The mechanical comminution and shredding are effected with the aid of crushing, comminuting or tearing apparatus, for example Hollanders, opening mills or crushing apparatus, or by extruding the suitably disintegrated flesh material through long, preferably gradually tapering, tubes. Finally, the resulting mass of swollen flesh fibres may be homogenized by treatment in kneaders or mixers, the fibrous mass being, if desired, adjusted to a desired water content. The water content of the protein-containing fibrous mass to be shaped by extrusion through annular nozzles may vary within relatively wide limits and preferably amounts to more than 75%, for example 85 to 95%.

The resulting pasty mass, which contains protein-containing fibres in as undamaged a condition as possible and in a highly swollen condition, is introduced into annular nozzles of the hereinbefore described construction.

An embodiment of apparatus according to this invention is illustrated in the accompanying diagrammatic drawing, in which—

Figure 1 is an elevation partly in section of the entire apparatus, in which the artificial skin or tube is produced and shaped into a helix, Figure 2 is a plan view of a part of the helical track or guiding means starting from the nozzle orifice, Figures 3 and 4 illustrate in longitudinal section particular embodiments of construction of the nozzles, and Figure 5 is a perspective view of a casing.

Two pots 2 and 3 are pivotally mounted on the supports of the framework 1, the pot 2 being in operation while the pot 3 is being charged. The pot 2 while in operation rests on a table 4, which is connected with the piston rod 5 and the piston 6 of an oil-compression cylinder 7. This compression cylinder is fed by means of an oil pump 8 from the storage reservoir 9 through the pipes 10. The pipes 10 are provided with the valves 11, which control the reciprocal motion of the piston 6. The supports of the framework carry the adjustable rings 12, on which the pots 2 and 3 rest on filling. During operation the piston 13, which is connected with a hollow piston rod 14 fixedly mounted on the framework 1, is disposed in the pot 2. The hollow piston rod is continued in a pipe 15, which carries the valve 16. This pipe opens into the double cylinder 17, which serves as a supply chamber and buffer.

The double piston 18, which is operated by oil pumped by the oil pump 19 from the oil container 20 through the pipe 21, serves to maintain the pressure in the cylinder. 22 is an excess pressure valve. The cylinder 17 is connected by a pipe 23, which branches through a three-way cock 24 into the pipes 25 and 26, with the high pressure cylinders 27 and 28, which are alternately filled and emptied.

The pistons 29 and 30 of the two high pressure cylinders are operated in any desired manner, for example by compressed air or by spindles. The high pressure cylinders are connected by the pipes 31 and 32, which are provided with valves 33 and 34, with the annular nozzle 35. This annular nozzle consists of a stationary jacket 36, which is continued in a stationary mouthpiece 37 and a rotatable core part 38, to which the stationary core part 39 is fixed. The latter is maintained at rest by the axle 40.

The stationary core part 39 and the axle 40 are hollow in order to enable air or other gases to be introduced. The rotatable core part 38 is driven by the toothed wheel 41. The rotatable core part 38 and the jacket 36 constitute an annular space 42, into which the pipes 31 and 32 open and through which the plastic kneadable mass is fed to the nozzle. The annular space 42 is continued in the annular space 43, which is constituted by the stationary core part 39 and the likewise stationary mouthpiece 37.

The entire nozzle is mounted on the working table 44. The tube 45 issuing from the annular nozzle 35 is conveyed forwards over the rollers 46 and 47, the rollers 46 being freely rotatable protecting rollers, while the rollers 47 are driven by elastic connections 48 from the main shaft 49. In order to avoid sticking or above all undesirable heating of the tube when stationary by heat taken up by the rollers from the drying space the rollers are provided with grooved, channeled or the like surfaces. In order to enable the rollers to be displaced, the approximately U-shaped roller supports 50 are adjustably mounted on rails 51 which proceed parallel to the shaft.

During operation the plastic kneadable fibrous mass is forced out of the pot 2 by the ascending table 4 operated by the piston 6 through the hollow piston rod 14 into the pipe 15 and when the valve 16 is opened passes into the cylinder 17, in which a pressure of 20 to 40 atms. prevails. From this cylinder the mass passes into the high pressure cylinders 27 and 28, from which they are alternately pressed by a pressure of 300 to 500 atms. through the pipes 31 and 32 into the annular space 42. Under the influence of the rotating core 38 the fibres are arranged in a definite manner, particularly in a tangential direction in the part next to the core. The fibrous mass passes from the annular space 42 into the annular space 43, which is constituted by stationary parts and in which the fibrous mass is axially disposed particularly in its outer layers. A straight tube issues from the annular space 43, which consists of fibres disposed crosswise or close together and consequently possesses particularly great strength. Air is blown into the tube from the hollow axle 40. The blown up tube is wound and withdrawn helically over the rollers 46 and 47. The tube may be dried and hardened during this withdrawal. The drying is effected by passing hot air over the inflated tube. In order to effect tanning known water-displacing and tanning agents are employed, such as aluminium sulphate, alumina, tannin or other tanning materials, preferably however products of the slow combustion, distillation or coking of cellulose-and-lignin-containing products, such as wood distillates. If desired, drying and hardening may be effected at a later stage.

In Figure 3 an annular nozzle 52 analogous to the annular nozzle 35 is illustrated, which however differs from the latter in that it contains a stationary core part 54, disposed eccentrically in the nozzle mouthpiece 53. On extruding the fibrous mass through this nozzle, a tube of non-uniform thickness is produced, the thicker wall of which becomes disposed on the outer side of the helical tube produced.

Figure 4 illustrates an annular nozzle 55, which is constructed similarly to the annular nozzle 35, but possesses a bevelled mouthpiece 56 and a likewise bevelled core part 57. On extruding the fibrous masses through this nozzle, a tube is formed which is curved corresponding to the bevel of the nozzle.

I claim:

1. An artificial spiral structure, comprising an extruded, tubular, seamless casing of uniform wall thickness of hardened and dried undamaged animal fibers produced from chemically swollen plastic, kneaded, protein fiber-containing masses of animal origin.

2. An artificial annular structure, comprising an extruded, tubular, seamless casing of uniform wall thickness of hardened and dried undamaged animal fibers produced from chemically swollen plastic kneaded, protein fiber-containing masses of animal origin.

3. A curved artificial sausage casing with a substantially uniform wall thickness formed from a plastic kneaded mass of pasty animal fibers in which said curved casing has the fibers disposed in layers and the fibers of said layers are arranged in non-parallel relation.

4. A curved artificial sausage casing formed with a uniform wall thickness from a plastic kneaded mass of pasty animal fibers in which said casing has the fibers disposed in layers and the fibers of said layers are arranged in non-parallel relation with a substantial portion thereof disposed transversely of the longitudinal axis of the casing.

5. A spiral artificial sausage casing formed with a uniform wall thickness from a plastic kneaded mass of pasty animal fibers in which said curved casing has the fibers disposed in layers and the fibers of said layers are arranged in non-parallel relation.

6. An annular sausage casing formed with a uniform wall thickness from a plastic kneaded mass of pasty animal fibers in which said casing has the fibers disposed in layers and the fibers of said layers are arranged in non-parallel relation with a substantial portion thereof disposed transversely of the longitudinal axis of the casing.

OSKAR WALTER BECKER.